United States Patent [19]

Picciolo

[11] 4,239,836
[45] Dec. 16, 1980

[54] SYSTEM FOR PROTECTING AND SEALING INTERCELL CONNECTING LINKS AND POLES OF INDUSTRIAL BATTERIES

[75] Inventor: William A. Picciolo, King, N.C.

[73] Assignee: Douglas Battery Manufacturing Co., Winston-Salem, N.C.

[21] Appl. No.: 30,110

[22] Filed: Apr. 16, 1979

[51] Int. Cl.³ .............................................. H01M 2/34
[52] U.S. Cl. ...................................... 429/65; 429/121
[58] Field of Search ................. 429/65, 121, 158, 159, 429/160

[56] References Cited

U.S. PATENT DOCUMENTS

| 1,801,282 | 10/1926 | McLean ................................. 429/65 |
| 2,194,885 | 3/1940 | Critchfield et al. ................. 429/158 |
| 3,264,141 | 8/1966 | Blaich et al. ......................... 429/160 |
| 3,884,725 | 5/1975 | Schmidt ................................ 429/65 |
| 4,078,122 | 3/1978 | Lotzsch et al. ..................... 429/121 |

FOREIGN PATENT DOCUMENTS 488227  11/1952  Canada ..................................... 429/160

*Primary Examiner*—Donald L. Walton

[57] ABSTRACT

A retaining cap having an open top and a plurality of openings in the bottom wall thereof corresponding in size, shape and spacing to the poles of the battery cells which protrude to the upper ends of the cells is assembled between selected poles of adjacent cells. After the conventional connecting link is then assembled to the adjacent terminals, a sealing compound, preferably a room temperature curing, silicon rubber compound in the polysiloxane family with a curing agent or solution from the dimethyl polysiloxane family is poured into the open top of the cap to encapsulate the intercell connecting link and the protruding poles of the cells. The sealing mixture is characterized by its flowability in the uncured state, its propensity to reseal itself after being ruptured, its usefulness throughout a broad range of operating temperatures, its non-adherence to styrenes and lead, and its resistence to sulfuric acid.

2 Claims, 3 Drawing Figures

SYSTEM FOR PROTECTING AND SEALING INTERCELL CONNECTING LINKS AND POLES OF INDUSTRIAL BATTERIES

BACKGROUND OF THE INVENTION

Industrial batteries are used in many places where conventional power lines do not extend or are otherwise not appropriate. Such industrial batteries may generally contain assembled in a casing, anywhere from six to sixty-four cells, each of which includes a positive and negative terminal, pole, or post extending upwardly therefrom. The cells are grouped, then the positive and negative terminals are connected from one cell to the next in a selected pattern so that a desired voltage may be obtained from the industrial battery. Such batteries have been in use for quite a while, and the batteries themselves are not the subject of the present invention.

Certain problems presently exist with such batteries which are difficult to solve. Firstly, it is desired to protect the terminals and intercell connecting links from metallic objects which might fall thereon from above. Such metallic objects lying across the top of the battery would probably tend to short out the cells of the battery or cause considerable damage. Also, in certain environments such as in coal mines it is necessary to keep the dust that is present in the atmosphere and the acid from within the battery from combining which makes the possibility of fires and/or explosions more likely.

Although it is desired to protect the terminals and intercell connecting links, it is also necessary to keep the poles accessible to probes for periodically taking readings and making tests.

Prior attempts to solve these problems include the pouring of tar or an asphalt base material (known as Goulds' Safety Seal) across the entire upper surface of the industrial battery. First of all tar or asphalt base material is very difficult to remove as it adheres to everything it touches in the top of the battery. Oftentimes it is necessary to remove the encapsulating material to make repairs or to replace selected cells. Further, with the material poured over the entire top of the industrial battery it is difficult to locate selected poles leading from cells in order to take readings therefrom. Even further, once the pole of the cells is located if a probe is extended through the tar or asphalt base material to engage the cell when it is removed a hole remains. After several of such readings are taken (and these readings are taken often) the sealing and protection offered by the encapsulating material is lost.

SUMMARY OF THE PRESENT INVENTION

The present invention on the other hand solves all of the above-named problems by, first of all utilizing a molding cap which is an open top, shallow cup-shaped member having openings in the bottom corresponding in size, shape and spacing to the size, shape and spacing between two selected terminals of adjacent cells. The retaining cap is first placed down over the selected poles of the adjacent cells, whereupon the connecting link is applied according to conventional practice. The cap is then filled with an encapsulating material which covers the exposed portions of the cell poles, as well as the intercell connecting links. However, the entire open top of the battery is not completely filled so that it is easy to locate and obtain access to selected poles of selected cells.

As far as the material is concerned there has been discovered a silicone rubber compound in the polysiloxane family which is designed and normally used for forming molds for low temperature materials. This compound is sold under the trademark "RTV700" by Silicone Products Department of General Electric Company, Waterford, N.Y. This compound is preferably mixed with a curing agent known as Beta 5, also a trademark of the Silicone Products Department of General Electric Company, Waterford, N.Y. Beta 5 is a solution of the dimethyl polysiloxane family which is specially formulated to improve the temperature resistance and range of the silicone rubber compound. Although the encapsulating material is designed for forming molds, it has the desirable characteristics of being flowable in the uncured state, vulcanizes or cures at room temperature, substantially resealing after rupture, useful throughout a broad range of temperatures, non-adhering to rubber base styrenes such as are used to form the molding cap and lead, and is resistant to sulfuric acid which is a necessity for battery use.

With the solution according to the present invention, many advantages now arise. The poles of the cells in the industrial battery are easy to locate, and when needle type probes are inserted through the encapsulating material and withdrawn the material exhibits sufficient resiliency to reseal itself to keep dust out. The encapsulating material is an excellent dielectric and has been tested and shown to withstand sulfuric acid. It is capable of use over a broad temperature range ($-75°$ F. to $400°$ F.) Further, the material does not adhere to the rubber base styrene which forms the cap into which the encapsulating material is poured, nor to the lead intercell connecting link, which makes the encapsulating material easy to remove from the retaining cap, make whatever repairs or replacements are necessary, then refill the cap with new material. Additional benefits of the material are that it is fire retardant and self-extinguishing.

There is therefore provided an improved system for sealing and protecting the exposed positive and negative poles of the cells of industrial batteries and the intercell connecting links therebetween.

It is another object of the present invention to provide an improved encapsulating system of the type described which covers only the exposed poles and intercell connecting links, without filling the entire top of the casing in which the cells of the battery are positioned.

It is still another object of the present invention to provide an encapsulating system of the type described in which the encapsulating material is of such resiliency to substantially reseal itself once it has been ruptured, is a good dielectric, is resistant to sulfuric acid and is operable throughout a broad range of temperatures.

Others objects and a fuller understanding of the invention will become apparent from reading the following detailed description of a preferred embodiment in view of the accompanying drawings in which.

DETAILED DESCRIPTION OF A PREFERRED EMBODIMENT

Figure 1:
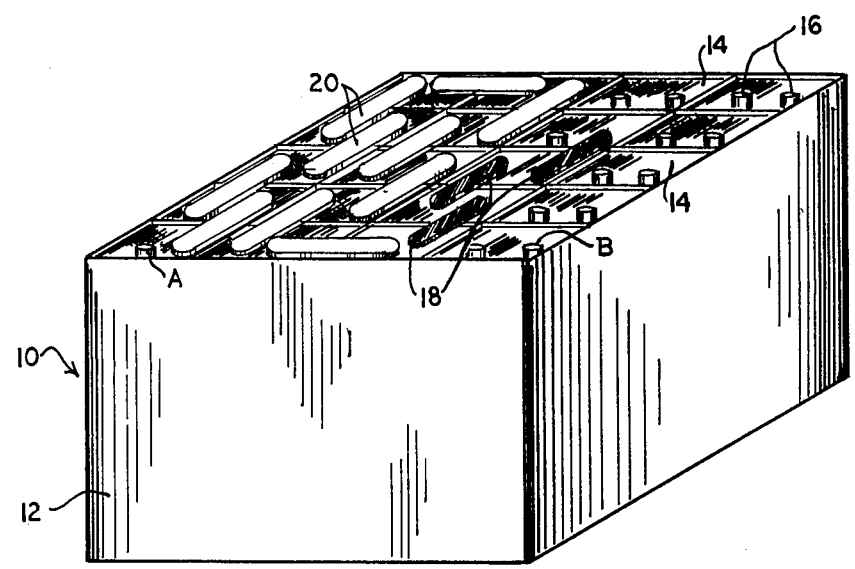
FIG. 1 is a perspective view showing an industrial battery of the type with which the present invention is contemplated. For purposes of illustration some of the poles and intercell connecting links are shown encapsulated and some non-encapsulated.

Turning now to the drawings and looking particularly at FIG. 1, there is illustrated an industrial battery 10 of the type with which the sealing and protective system according to the present invention is designed. Such industrial batteries 10 include a casing 12 which houses a plurality of battery cells 14. In practice, the number of cells may vary from six to sixty-four depending upon the output voltage required of the battery 10. Each cell 14 includes a pair of exposed poles or posts 16, one being a positive, the other a negative. The cells 14 are connected by a plurality of intercell connecting links 18 which connect the positive pole of one cell to the negative pole of the next cell so that when a circuit is connected to the positive and negative terminals A,B respectively of the entire battery, the sum of all the voltages is added to provide a large output.

Figure 3:
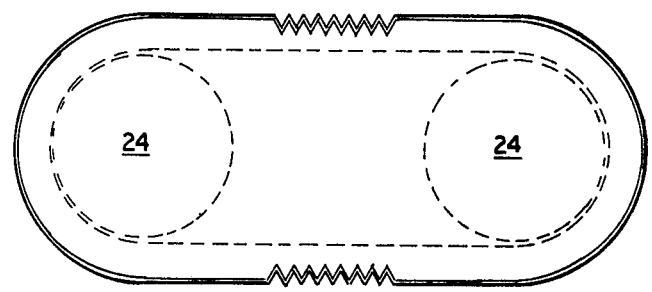
FIG. 3 is a plan view of the retaining cap illustrated in section in FIG. 2.

Whereas it was mentioned previously in the application that prior art solutions to the problem of encapsulating the intercell connecting links and exposed poles have included pouring of a sealing material over the entire upper surface of the battery 10 between the walls of the casing 12, it was also shown that such a solution was not satisfactory. It is seen from FIG. 1 that it would be very difficult to determine where a dead cell occurred in the middle of the battery 10, if the operator could not locate the poles 16 across which he wanted to take a reading. Looking at the left side of the top portion of the battery in FIG. 1 as well as FIGS. 2 and 3, there is illustrated a system for encapsulating and providing protection for the poles and connecting links, while still overcoming the problems outlined hereinabove. In accordance with this solution, the intercell links 18 which connect selected pairs of terminals 16 are encapsulated separate and individually from the other links posts by means of a unique encapsulating system 20.

Figure 2:
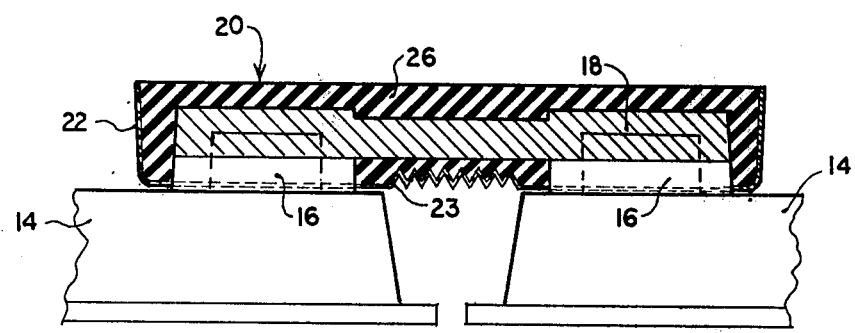
FIG. 2 is an enlarged sectional view illustrating portions of two adjacent cells and the manner in which the exposed poles of the cells are electrically connected by means of a connecting link, the poles and intercell connecting link being encapsulated according to the present invention.

Looking at FIG. 2 the encapsulating system 20 includes first of all a retaining cap 22 which is a shallow, open top, cup-like housing. A pair of openings 24 (FIG. 3) are placed in the bottom wall 23 of the cap 22, which openings 24 correspond in size, shape and spacing to the two adjacent poles 16 of adjacent cells 14 desired to be connected. As illustrated in FIG. 2, when the cap is in position over the poles 16, the poles extend through openings 24, then the connecting link 18 is installed across the top of the pole 16. The encapsulating material or mixture 26 is then mixed and poured into the cap 22 whereupon it flows around, under and atop the exposed portions of the poles 16 as well as the connecting link 18. The material cures or sets up in three to twenty-four hours, whereupon the sealing and protecting step is complete.

By way of specifics, the cap 22 is preferably molded from a polystyrene material. The insulating material or mixture 26 may be formed of any synthetic or natural material which combines the characteristics of being flowable in the uncured state, yet sets up and cures at room temperature after a period of three to twenty-four hours, which does not adhere to rubber base styrenes or lead, which can withstand sulfuric acids, which is a good dielectric, which is sufficiently resilient to reseal itself after a rupture, and which can withstand operating temperatures throughout a broad temperature range. One excellent material which applicant has discovered and which is the preferred encapsulating material 26 is RTV700 Silicone Rubber, a product sold by the General Electric Company, which is mixed with a Beta 5 curing agent. Beta 5 is also a curing agent manufactured and sold by General Electric Silicone Products Department. The RTV700 material is primarily designed to form molds for the molding of low temperature materials; however, has been found to be excellent in the instant invention. This preferred insulating material (RTV700 plus Beta 5) is operative through a temperature range between $-75°$ F. and $600°$ F. Preferably, the RTV700 is mixed with the curing agent at a ratio by weight of 10:1. In addition the encapsulating material (RTV700 plus Beta 5) is fire retardant and self-extinguishing.

Such an encapsulating material 26 enables an operator to easily locate a desired cell pole at which a reading is desired, insert his needle probe down through the encapsulating material and withdraw it. The material will then substantially reseal itself to provide protection from shorts and dust. Since the encapsulating material 26 does not adhere to either the retaining cap 22 or the connecting link 18, it may be easily peeled off when access to a cell(s) is necessary for repair or replacement.

While a detailed description of a preferred embodiment has been described hereinabove it is apparent that various changes might be made to the invention without departing from the scope thereof which is set forth in the claims below.

What is claimed is:

1. In an apparatus for protecting and sealing poles and intercell connecting links of industrial batteries of the type in which a plurality of cells are grouped together and wherein a pole of one cell is connected to a pole of an adjacent cell by means of a connecting link, the improvement in said apparatus which comprises:
    (a) a retaining cap including a bottom wall, side wall, and an open top;
    (b) said bottom wall including openings therein corresponding in size, shape, and spacing to the poles of adjacent battery cells which are received, when assembled, through the upper ends of the cells and are joined by said connecting link;
    (c) said bottom wall, when assembled lying between said connecting link and the upper surface of the corresponding cell; and
    (d) said retaining cap containing an encapsulating mixture surrounding said connecting link and substantially the entire exposed cell terminal cover bushing, said encapsulating mixture being a substance having the capabilities of flowing in its uncured state, resealing itself after puncture, remaining stable during exposure to a broad range of temperatures, resisting adherence to styrene and lead, and resisting damage from sulfuric acid.

2. The apparatus according to claim 1 wherein said encapsulating material comprises a silicone rubber which is a member of the polysiloxane family and vulcanizes at room temperature.

* * * * *